(12) United States Patent
Nakanishi et al.

(10) Patent No.: US 7,230,565 B2
(45) Date of Patent: Jun. 12, 2007

(54) RADAR

(75) Inventors: Motoi Nakanishi, Nagaokakyo (JP); Toru Ishii, Hirakata (JP); Tetsu Nishimura, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 151 days.

(21) Appl. No.: 10/519,642

(22) PCT Filed: Jun. 10, 2003

(86) PCT No.: PCT/JP03/07311

§ 371 (c)(1), (2), (4) Date: Aug. 9, 2005

(87) PCT Pub. No.: WO2004/005958

PCT Pub. Date: Jan. 15, 2004

(65) Prior Publication Data

US 2006/0109168 A1 May 25, 2006

(30) Foreign Application Priority Data

Jul. 5, 2002 (JP) ............................. 2002-197487

(51) Int. Cl.
*G01S 13/42* (2006.01)

(52) U.S. Cl. ............................. 342/70; 342/70; 342/81; 342/85; 342/133; 342/139; 342/146; 342/158

(58) Field of Classification Search ............ 342/70–72, 342/81–87, 133, 139, 146, 147, 157, 158
See application file for complete search history.

(56) References Cited

U.S. PATENT DOCUMENTS 4,338,607 A * 7/1982 Drabowitch ................ 343/754
5,467,283 A * 11/1995 Butsuen et al. ............. 701/301
5,926,126 A * 7/1999 Engelman .................... 342/70
6,621,448 B1 * 9/2003 Lasky et al. .................. 342/22
2002/0190895 A1* 12/2002 Nakanishi et al. .......... 342/146
2003/0102998 A1* 6/2003 Ishii et al. .................... 342/70
2003/0151544 A1* 8/2003 Nishimura et al. ........... 342/70

(Continued)

FOREIGN PATENT DOCUMENTS

GB 2041687 A * 9/1980

(Continued)

OTHER PUBLICATIONS

Office Communication issued in corresponding Japanese Patent Application No. 2002-197487, dated Aug. 15, 2006.

*Primary Examiner*—John B. Sotomayor
(74) *Attorney, Agent, or Firm*—Keating & Bennett, LLP

(57) ABSTRACT

A radar can detect target azimuths located outside and adjacent to a scanning angular range of a beam by determining changes in received signal strength (a signal-strength profile) in the azimuthal direction as a function of a beam azimuth in a predetermined scanning angular range, and estimating the target azimuth causing the signal-strength profile from the signal-strength profile, which is portion of a convex located adjacent to the outermost angle in the scanning angular range. For example, the target azimuth is estimated by a ratio between the received signal strength at the outermost angle of about 10.0° and the received signal strength at about 9.5°, which is one beam inside the outermost position.

9 Claims, 8 Drawing Sheets

U.S. PATENT DOCUMENTS

2003/0184470 A1* 10/2003 Ishii et al. .................. 342/174
2003/0210172 A1* 11/2003 Pleva et al. ................... 342/70
2005/0174282 A1* 8/2005 Nakanishi et al. .......... 342/109
2006/0109168 A1* 5/2006 Nakanishi et al. ............ 342/70

FOREIGN PATENT DOCUMENTS

| | | | |
|---|---|---|---|
| JP | 58132676 A | * | 8/1983 |
| JP | 59211878 A | * | 11/1984 |
| JP | 60-69575 | | 4/1985 |
| JP | 62-194478 | | 8/1987 |
| JP | 10-73656 | | 3/1998 |
| JP | 11-64500 | | 3/1999 |
| JP | 11-231053 A | | 8/1999 |

* cited by examiner

FIG. 4

| DEGREE (deg) | RELATIVE GAIN (dB) | GAIN DIFFERENCE FROM BEAM 0.5° INSIDE (dB) | RELATIVE GAIN OF TRANSMITTED-RECEIVED BEAM (dB) |
|---|---|---|---|
| −5 | −27.5 | −55.00 | 10.00 |
| −4.5 | −22.5 | −45.00 | 9.00 |
| −4 | −18 | −36.00 | 8.00 |
| −3.5 | −14 | −28.00 | 7.00 |
| −3 | −10.5 | −21.00 | 6.00 |
| −2.5 | −7.5 | −15.00 | 5.00 |
| −2 | −5 | −10.00 | 4.00 |
| −1.5 | −3 | −6.00 | 3.00 |
| −1 | −1.5 | −3.00 | 2.00 |
| −0.5 | −0.5 | −1.00 | 1.00 |
| 0 | 0.00 | 0.00 | |
| 0.5 | −0.50 | −1.00 | 1.00 |
| 1 | −1.50 | −3.00 | 2.00 |
| 1.5 | −3.00 | −6.00 | 3.00 |
| 2 | −5.00 | −10.00 | 4.00 |
| 2.5 | −7.50 | −15.00 | 5.00 |
| 3 | −10.50 | −21.00 | 6.00 |
| 3.5 | −14.00 | −28.00 | 7.00 |
| 4 | −18.00 | −36.00 | 8.00 |
| 4.5 | −22.50 | −45.00 | 9.00 |
| 5 | −27.50 | −55.00 | 10.00 |

| DEGREE (deg) | LEVEL DIFFERENCE (dB) |
|---|---|
| 10 | ~1.5 |
| 10.5 | 1.5~2.5 |
| 11 | 2.5~3.5 |
| 11.5 | 3.5~4.5 |
| 12 | 4.5~5.5 |
| 12.5 | 5.5~6.5 |
| 13 | 6.5~7.5 |
| 13.5 | 7.5~8.5 |
| 14 | 8.5~9.5 |
| 14.5 | 9.5~ |

RADAR

BACKGROUND OF THE INVENTION

1. Field of the Invention

The present invention relates to a radar for scanning a beam over a predetermined scanning range.

2. Description of the Related Art

A millimeter-wave type of car-mounted radar that varies the beam azimuth over a predetermined scanning range has been developed. This type of radar transmits and receives a detection signal, and scans a beam to detect the azimuth of a target from changes in received signal strength. For example, in Japanese Unexamined Patent Application Publication No. 2000-180532, changes in received signal strength in the azimuthal direction are determined. When the pattern of the changes in the received signal strength includes a chevron, the azimuth at which a peak of the received signal strength occurs is detected as the target azimuth.

However, this detecting method of the target azimuth based on the chevron pattern of the changes in the received signal strength (a signal-strength profile) generated by the beam scanning cannot detect the azimuth of a target that does not produce a chevron in the signal-strength profile. For example, when a target exists at an azimuth of the outermost angle in the scanning angular range of the beam, only one side of a chevron is formed. Moreover, when a target exists outside and adjacent to the outermost angle where the azimuth can be detected in a beam width, only a portion of a chevron is formed in the signal-strength profile. In both cases, however, only a "shadow" of the target located outside the scanning angular range is cast in the scanning angular range, and the position of the peak in the signal-strength profile cannot be detected. As a result, the target azimuth cannot be detected.

SUMMARY OF THE INVENTION

To overcome the problems described above, preferred embodiments of the present invention provide a radar that can detect target azimuths located outside and adjacent to a scanning angular range of a beam.

According to the radar of preferred embodiments of the present invention, when a target is adjacent to a predetermined scanning angular range, a signal-strength profile having a portion of a convex adjacent to the outermost angle in the scanning angular range is determined, and the approximate target azimuth is estimated from this signal-strength profile. Accordingly, the target azimuth can be detected beyond the scanning angular range.

Moreover, the target azimuth is estimated from a ratio between received signal strengths at at least two beam azimuths. Accordingly, the target azimuth can be estimated with a small amount of data and with a simple calculation.

Furthermore, the reflectivity of the target is determined on the basis of the ratio between the received signal strengths at the two beam azimuths and the directional characteristic of an antenna. Accordingly, not only the azimuth but also the approximate size of the target is detected for a target outside and adjacent to the outermost angle in the scanning angular range.

In addition, the target azimuth is estimated from the number of beams having received signal strengths exceeding a threshold level and from the received signal strength of at least one of the beams in an azimuth range of half of a beam width, from the outermost angle, having antenna gains exceeding a predetermined threshold level. Accordingly, the target azimuth adjacent to the scanning angular range can be estimated with a simple process.

Other features, elements, steps, characteristics and advantages of the present invention will become more apparent from the following detailed description of preferred embodiments with reference to the attached drawings.

BRIEF DESCRIPTION OF THE DRAWINGS

FIG. 4 illustrates the relationship between the azimuthal angle of the antenna and the gain and the like.

DETAILED DESCRIPTION OF PREFERRED EMBODIMENTS

The structure of a millimeter-wave car-mounted radar according to preferred embodiments of the present invention will now be described with reference to the drawings.

Figure 1:
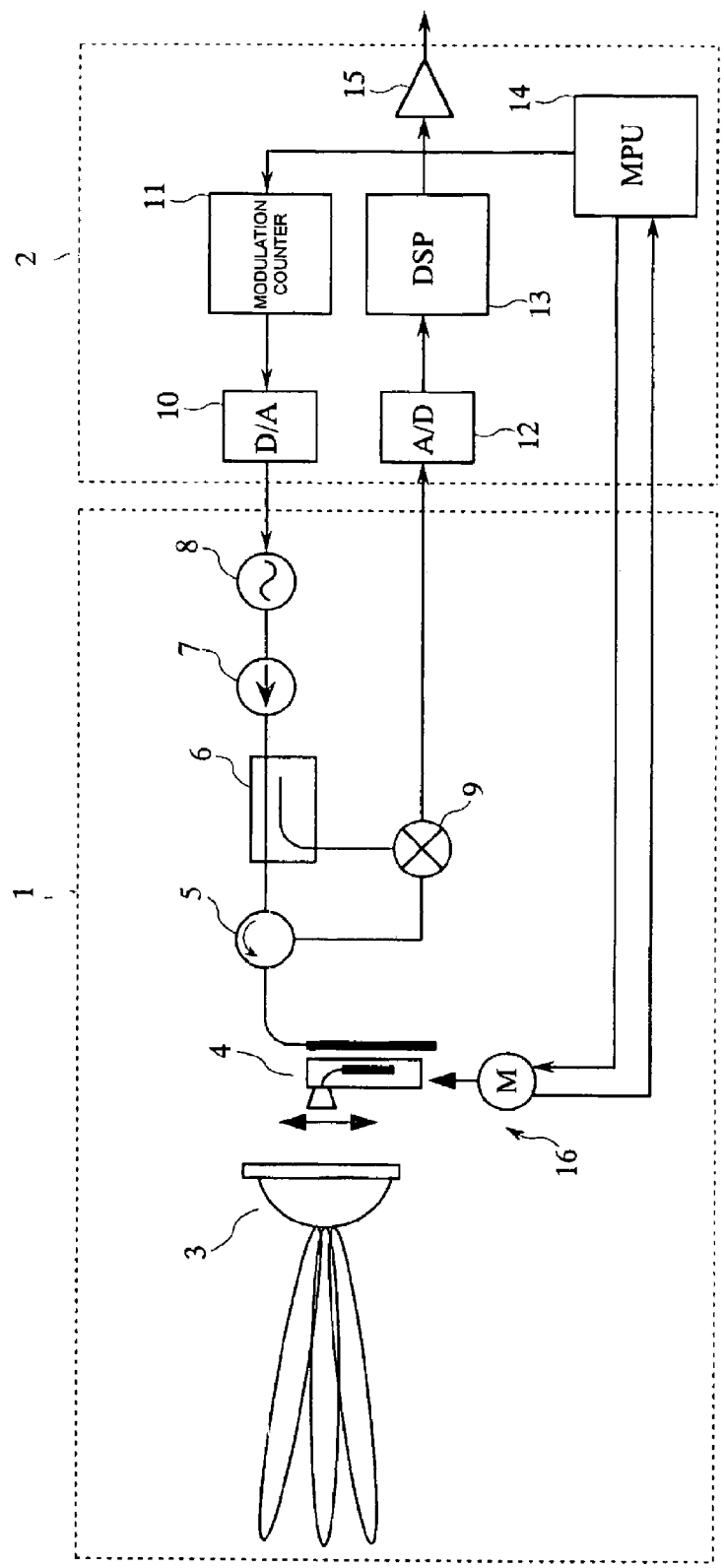
FIG. 1 is a block diagram illustrating the structure of a radar according to a preferred embodiment of the present invention.

FIG. 1 is a block diagram illustrating the structure of the radar. In FIG. 1, the element 1 is an RF block and the element 2 is a signal-processing block. The RF block 1 transmits and receives a millimeter-wave detection radio wave, and outputs a beat signal between a transmitted wave and a received wave to the signal-processing block 2. A modulation counter 11 in the signal-processing block 2 counts the beat signals to generate a triangular wave from a D/A converter 10, and outputs the value to the D/A converter 10. The D/A converter 10 converts the count value into an analog voltage signal, and provides the signal to a voltage-controlled oscillator (VCO) 8 in the RF block 1. Herewith, the transmitted wave is frequency-modulated. The signal oscillated by the VCO 8 is supplied to a primary radiator 4 via an isolator 7, a coupler 6, and a circulator 5. This primary radiator 4 is disposed at a focal plane or adjacent to the focal plane of a dielectric lens 3. The dielectric lens 3 focuses the millimeter-wave signal radiated from the primary radiator 4 into a sharp beam. The primary radiator 4 and the dielectric lens 3 define an antenna.

When a reflected wave from a target, such as a vehicle, enters the primary radiator 4 via the dielectric lens 3, the received signal is sent to a mixer 9 via the circulator 5. The received signal and a local signal that is a part of the transmitter signal from the coupler 6 are input to the mixer 9, and a beat signal having a frequency corresponding to the frequency difference between the received signal and the local signal is output to an A/D converter 12 in the signal-processing block 2 as an intermediate-frequency signal. The A/D converter 12 converts the signal into digital data. A digital signal processor (DSP) 13 performs a fast Fourier transform (FFT) on the data stream input from the A/D converter 12 to calculate the relative distance and the relative speed of the target, and outputs them to a host via an output circuit 15.

The element 16 in the RF block 1 is a scanning unit that translates the primary radiator 4 in the focal plane of the dielectric lens 3 or in a plane parallel to the focal plane. A 0-dB coupler is provided between the moving portion including the primary radiator 4 and the fixed portion. The element M is a driving motor for the scanning unit 16. A beam is scanned by this motor, for example, within a range from about −10.0° to about +10.0° in steps of about 0.5° at intervals of about 100 ms.

The element 14 in the signal-processing block 2 is a microprocessor unit that controls the modulation counter 11 and the scanning unit 16. This microprocessor unit 14 orients the beam azimuth to a predetermined angle using the scanning unit 16, and determines a count interval while the scanning unit 16 is stationary such that the VCO 8 modulates in a range of one wavelength including an upslope and a downslope of a triangle wave.

Figure 2:
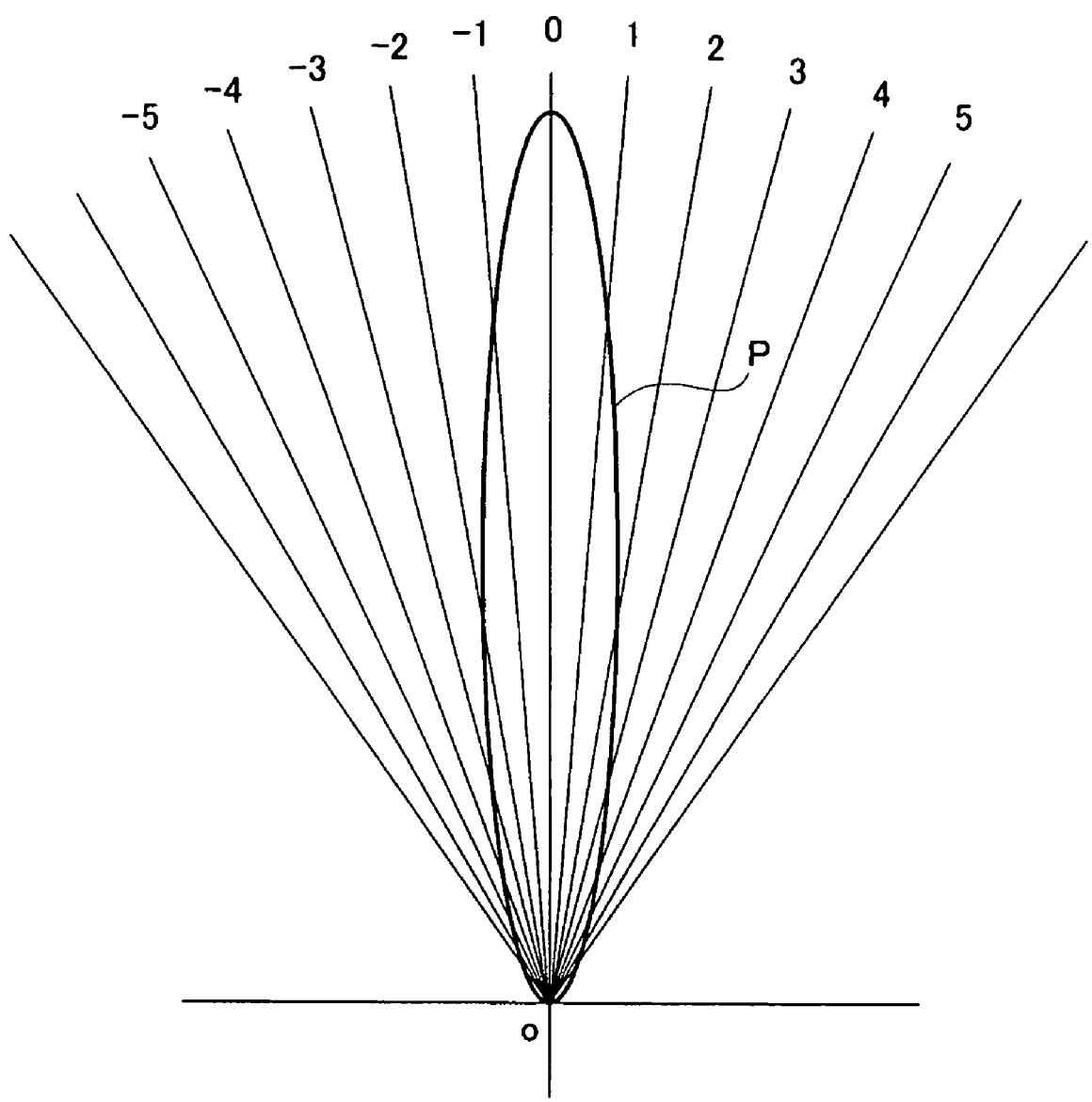
FIG. 2 illustrates a directional characteristic of an antenna of the radar.

FIG. 2 illustrates a directional characteristic of the above-described antenna. The symbol o indicates the position of the antenna, and the symbol P indicates a pattern of the directional characteristic. In this pattern, the lengths in the direction of radiation from the position o, which is defined as 0, illustrate the gain of the antenna.

Figure 3:
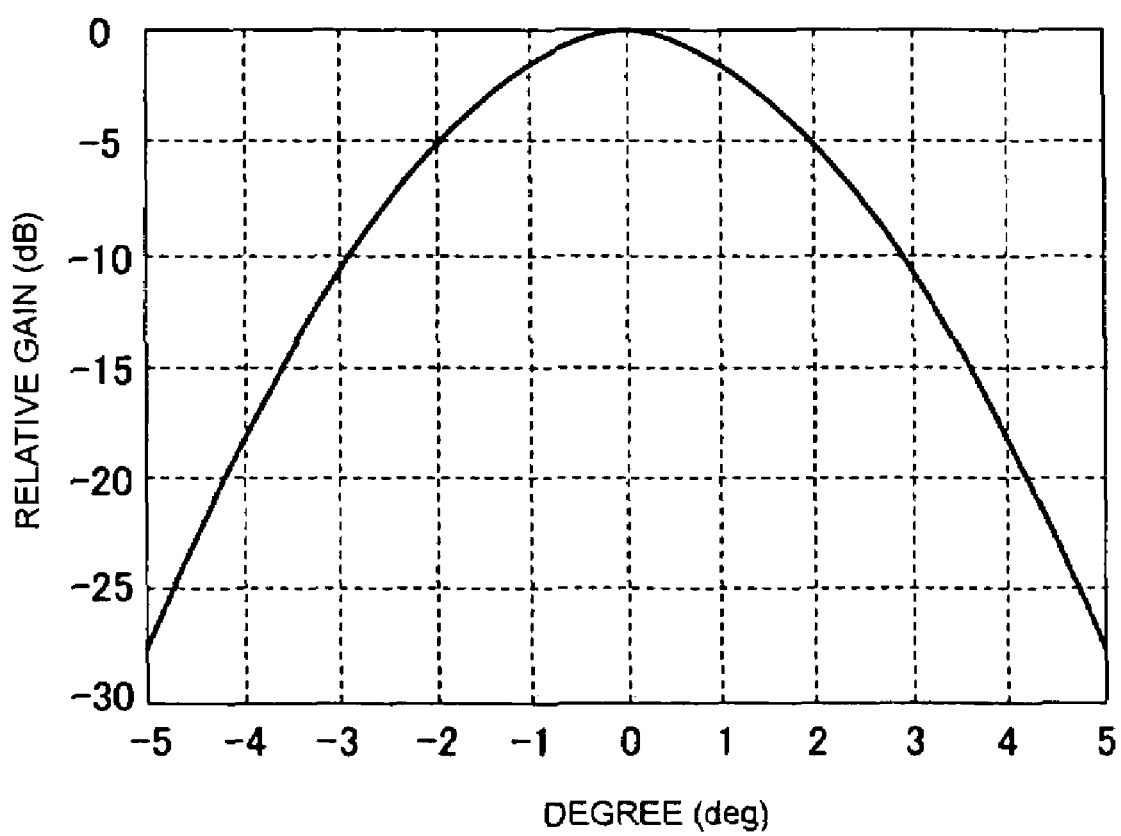
FIG. 3 illustrates the directional characteristic of the antenna plotted on Cartesian coordinates.

FIG. 3 illustrates the directional characteristic of the antenna shown in FIG. 2 plotted on Cartesian coordinates. The horizontal axis is the beam azimuth, and the vertical axis is a relative gain when the gain at the azimuth of 0°, i.e. the forward direction, is defined as 0 dB. For example, the relative gain is about −5 dB for a beam azimuth of about +2° or about −2°, and the relative gain is about −18 dB for a beam azimuth of about +4° or about −4°. When signals having higher received signal strengths than a threshold level of the relative gain of about −27.5 dB are defined as signal components, signals having lower received signal strengths are defined as noise components, thereby one beam has a width ranging from about −5° to about +5°, i.e. about 10°.

In a known technology, changes in the received signal strength as a function of the beam azimuth are determined as a signal-strength profile, and the azimuth of the maximum strength in a distribution of a series of the received signal strengths is simply determined as the target azimuth. For example, when the scanning angle ranges from about −10° to about +10°, targets located within a range from about −15° to about −10° are recognized as if all of them were located at about −10°, and targets located within a range from about +10° to about +15° are recognized as if all of them were located at about +10°.

However, the ratio between the received signal strength obtained from the outermost (in terms of angle) beam in the scanning angular range of the beam and the received signal strength obtained from one beam or a plurality of beams inside the outermost beam is determined by the azimuth of a target located adjacent to the outermost angle and outside the outermost angle. Accordingly, the target azimuth can be estimated by determining this ratio between the received signal strengths.

FIG. 4 is a numerical table corresponding to the characteristic shown in FIG. 3. "Relative gain of transmitted-received beam" herein means a dB difference between the relative gain of a transmitted signal and the relative gain of a received signal when the beam azimuth varies in the scanning angular range of the beam. Accordingly, the value is twice as large as the "relative gain". Furthermore, the "gain difference from beam located about 0.5° inside" is a dB difference between the above-described "relative gain of transmitted-received beam" and that of a beam located about 0.5° inside the outermost position.

Figure 5:
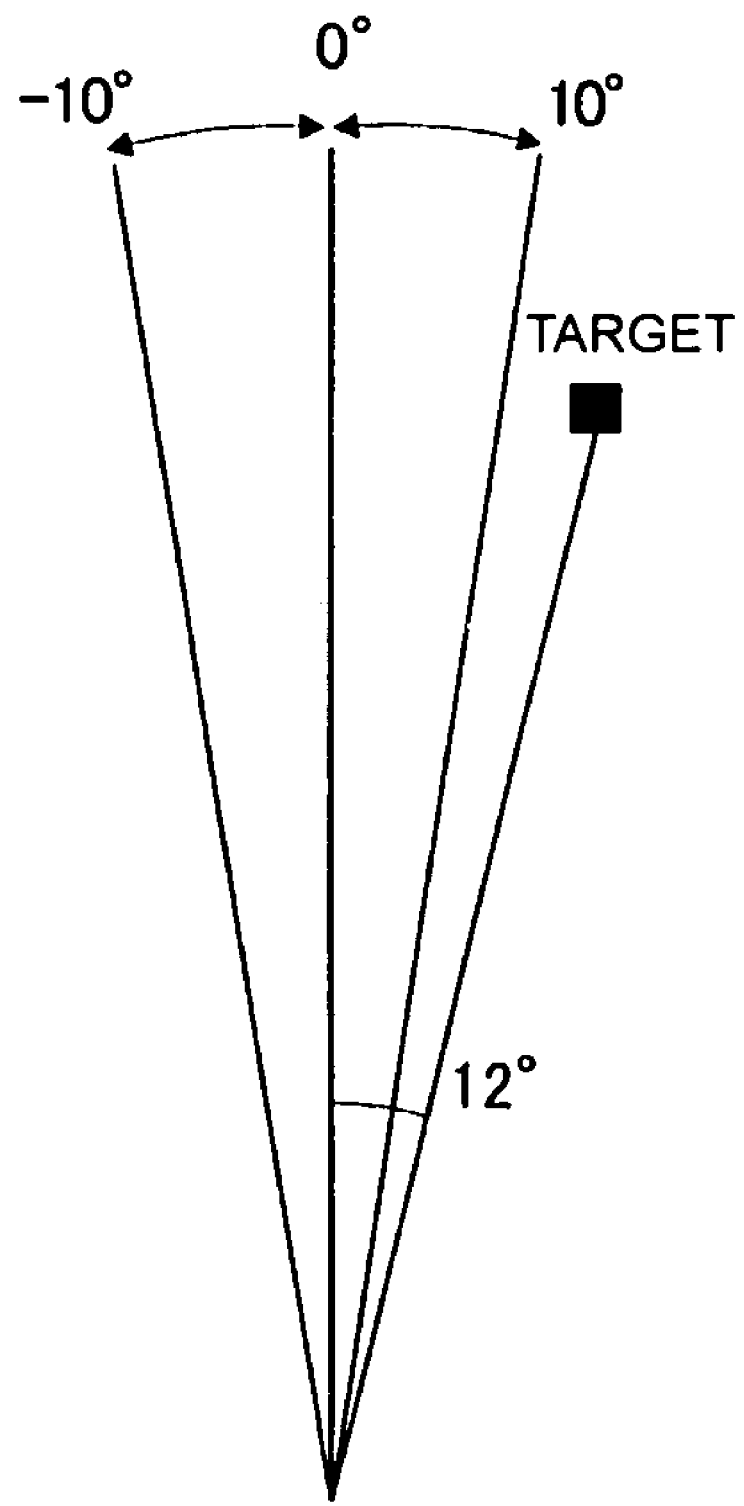
FIG. 5 illustrates the layout of a scanning range of a beam and the position of a target.

FIG. 5 illustrates the layout of a scanning angular range of a beam and the position of a target located outside and adjacent to the outermost angle. In this preferred embodiment, the target is preferably located at an azimuth of about +12° that is about +2° outside the outermost angle of about 10°.

Figure 6:
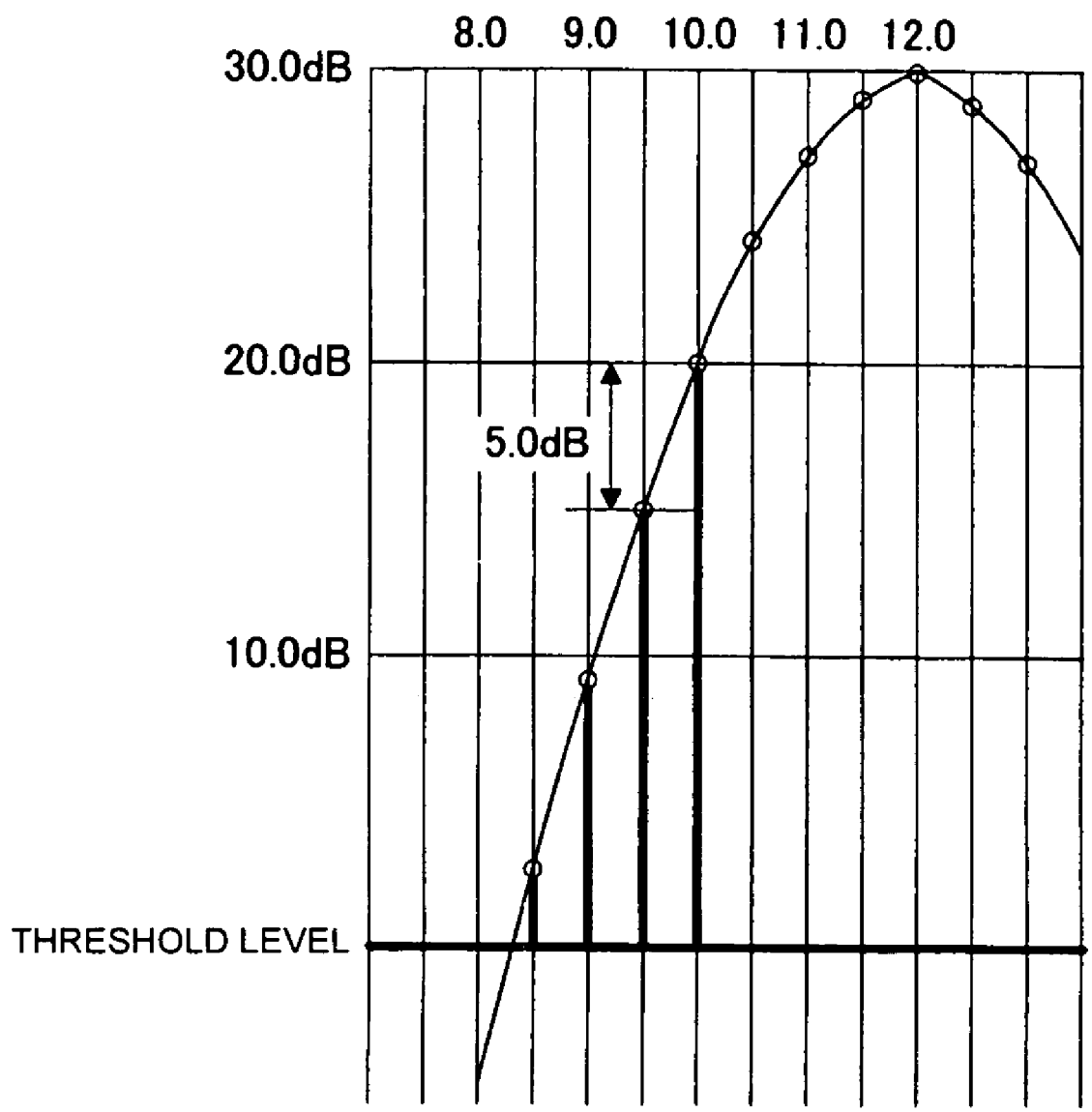
FIG. 6 illustrates an example of changes in received signal strength as a function of the azimuthal angle of the beam.

FIG. 6 illustrates an example of changes in the received signal strength as a function of the beam azimuth. As illustrated, the received signal strength increases as the beam azimuth approaches the outermost angle of about 10.0°, and this signal-strength profile is a portion of a convex.

As in this example, when the scanning angular range from about −10° to about +10° is scanned in angular steps of about 0.5°, the relative gain of the transmitted-received beam to the target located at about +12° is about −10 dB, as shown in FIG. 4, since the target is located at a position of about +2° relatively to the beam of about +10°. Furthermore, since this target is located at an azimuth of about +2.5° relatively to the beam of about +9.5°, the relative gain of the transmitted-received beam is about −15 dB. Therefore, the difference, in dB, between both of the received signal strengths is about 5 dB.

When this relationship is used, the target azimuth can be estimated using the difference between the received signal strength of the beam at the outermost angle of about 10.0° and the received signal strength of the beam at about 9.5°.

Figures 7, 8:
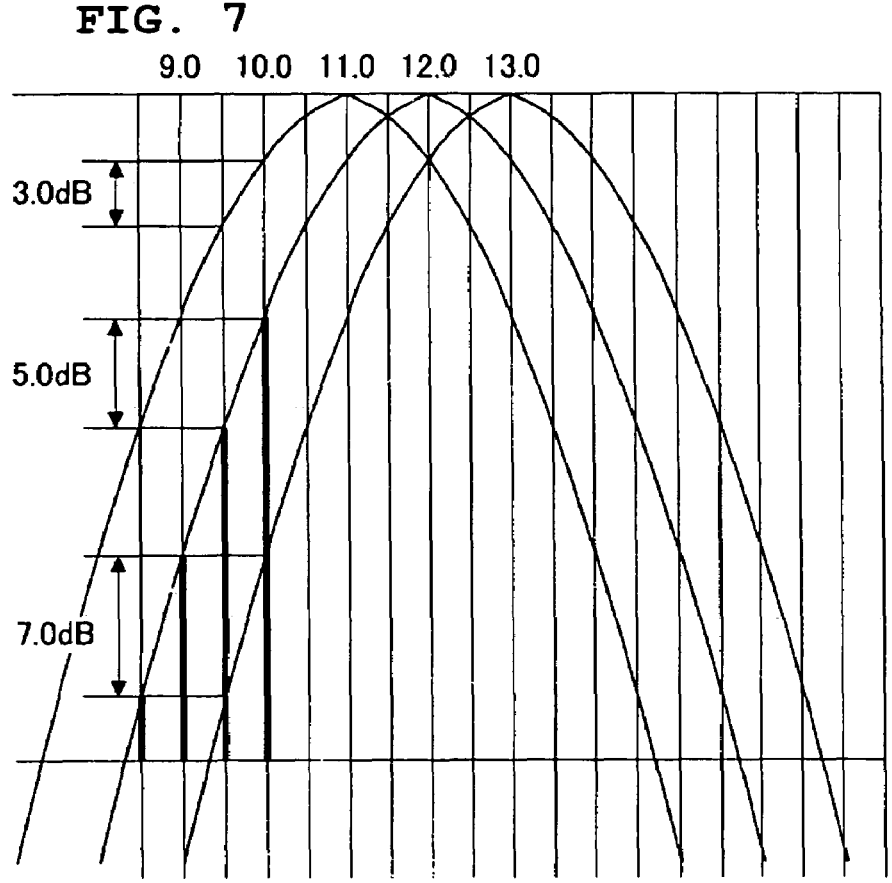
FIG. 7 illustrates changes in differences of received signal strengths between the outermost beam and the second outermost beam when the target azimuth is varied.
FIG. 8 illustrates the relationship of differences of the received signal strengths between the outermost beam and the second outermost beam.

FIG. 7 illustrates an example of changes in the differences of the received signal strengths between the outermost beam and the second outermost beam when the target azimuth is varied among three different values, namely, about 11.0°, about 12.0°, and about 13.0°. As described above, when the target azimuth is about 12°, the difference between the above-described received signal strengths is about 5.0 dB. On the other hand, the difference between the signal strengths is about 3.0 dB for the target azimuth of about 11.0°, and the difference between the signal strengths is about 7.0 dB for the target azimuth of about 13°.

FIG. 8 illustrates the differences of the received signal strengths between the outermost beam on the plus side (about +10.0°) and the second outermost beam (about +9.5°) derived from FIG. 4. In the above-described example, since the difference of the received signal strengths between the outermost beam and the second outermost beam is 5 dB, the estimated target azimuth is about +12° from FIG. 8.

The positive azimuth is illustrated in FIG. 8; however, the same result is achieved for the negative azimuth.

Furthermore, when these relationships are used, the received signal strength can be estimated on the assumption that a beam is radiated to a target located at an estimated azimuth. When the target azimuth is about 12.0°, the relative angle to the outermost angle of about 10.0° is about 2.0°, and the relative gain of the transmitted-received beam is about −10 dB according to FIG. 3 as compared to a case when the beam azimuth is the outermost angle of about 10.0°. Consequently, if a beam is radiated in the direction of about 12.0°, a receives signal having a strength that is about 10 dB higher than the received signal strength detected when the beam azimuth is about 10.0° will be detected. In this manner, the received signal strength when the beam is directed to the beam azimuth and a scattering cross-section can be estimated from the received signal strength of the outermost beam. In other words, the approximate size of the target can be detected. The term "scattering cross-section" herein means the radio-wave reflectivity of the target converted into a cross-section of a sphere $\pi r^2$ (m$^2$), where r (m) is radius of the sphere. For a millimeter-wave radar, the scattering cross-section is about 10 (m$^2$) for a vehicle, and is about 1 (m$^2$) for a bicycle.

Next, a radar according to a second preferred embodiment will be described. The structure of the hardware is preferably the same as that of the first preferred embodiment.

The width of the azimuthal directions having antenna gains exceeding a predetermined threshold level is defined as a beam width, and a beam scans at angular intervals narrower than the beam width. At this time, if a target exists outside the outermost angle, the received signal strengths of a plurality of beams located inside the outermost angle exceed a predetermined threshold level.

The radar according to the second preferred embodiment estimates the target azimuth on the basis of the number of these beams and the received signal strengths.

Figure 9:
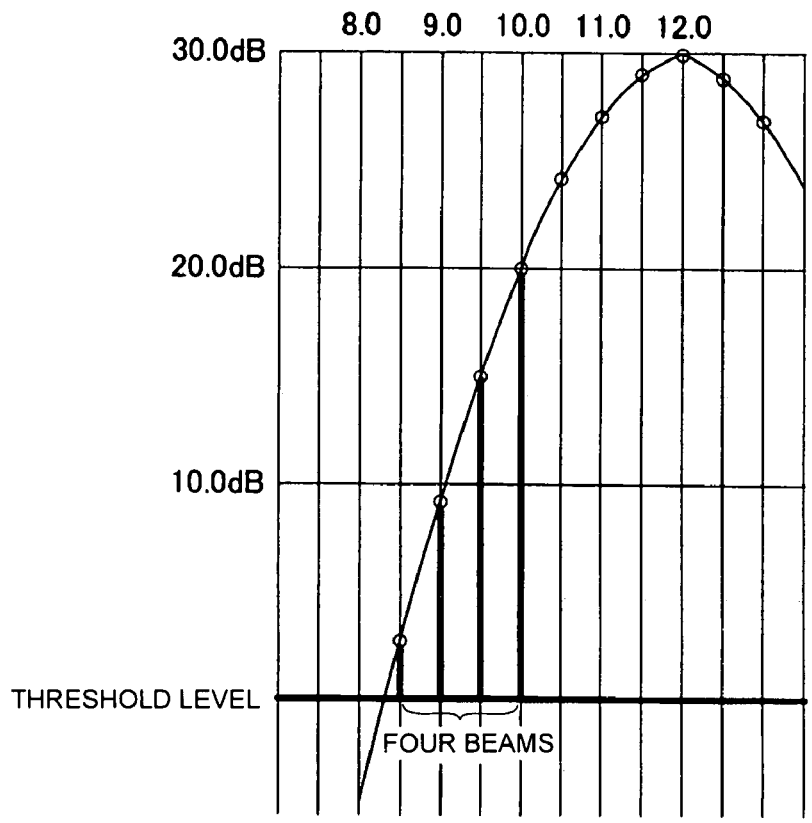
FIG. 9 illustrates an example of the number of beams having received signal strengths exceeding a threshold level.

FIG. 9 illustrates an example of changes in the received signal strength as a function of the beam azimuth. As illustrated, the received signal strength increases as the beam azimuth approaches the outermost angle of about 10.0°, and this signal-strength profile forms a portion of a convex.

In this example, the number of beams having received signal strengths exceeding the threshold level is four including the beam at the outermost angle of about 10.0°.

Figure 10:
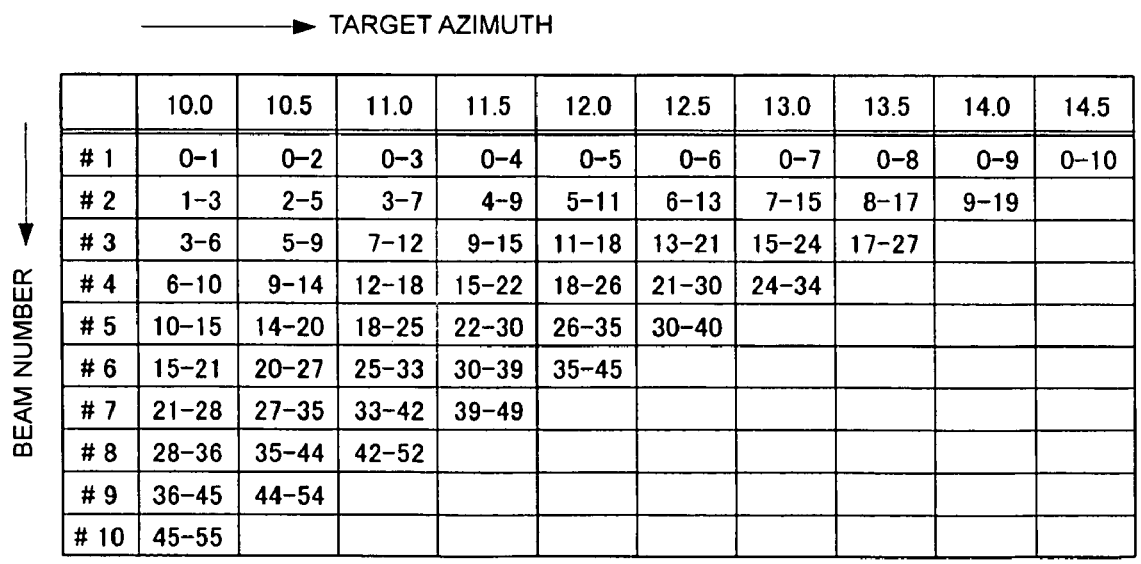
FIG. 10 illustrates the relationship among the number of beams having the received signal strengths exceeding the threshold level, the received signal strength of the outermost beam, and the estimated azimuth of the target.

For example, when a beam is scanned within a range from about −10.0° to about +10.0° in 41 steps at intervals of about 0.5°, the beams that exceed the threshold level are numbered #1, #2, #3, . . . from the inside, and the received signal strength ΔP (dB) that exceeds the threshold level is determined. FIG. 10 illustrates the relationship among the above-described beam number, the received signal strength ΔP, and the target azimuth.

For example, when the number of beams having a received signal strength that exceeds the threshold level is four and the received signal strength ΔP of the outermost beam (#4) is about 20 dB, the estimated target azimuth is in a range from about 11.5° to about 12.0°.

According to preferred embodiments of the present invention, when a target exists adjacent to a predetermined scanning angular range, a signal-strength profile having a portion of a convex adjacent to the outermost angle in the scanning angular range is determined. Since the approximate target azimuth is estimated from this signal-strength profile, the target azimuth can be detected beyond the scanning angular range.

Moreover, according to preferred embodiments of the present invention, since the target azimuth is estimated from the difference between received signal strengths at at least two beam azimuths, the target azimuth can be estimated with a small amount of data and with a simple calculation.

Furthermore, according to preferred embodiments of the present invention, since the reflectivity of the target is determined on the basis of the ratio between the received signal strengths at the two beam azimuths and the directional characteristic of the antenna, not only the azimuth but also the approximate size of the target can be detected for a target outside and adjacent to the outermost angle in the scanning angular range.

In addition, according to preferred embodiments of the present invention, since the target azimuth is estimated from the number of beams having received signal strengths exceeding a threshold level and from the received signal strength of at least one of the beams in an azimuth range of half of a beam width, from the outermost angle, having antenna gains exceeding a predetermined threshold level, the target azimuth adjacent to the scanning angular range can be estimated with a simple process.

As described above, the radar according to preferred embodiments of the present invention can detect the target azimuth beyond the scanning angular range, and is useful for, for example, millimeter-wave car-mounted radar.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the invention which fall within the true spirit and scope of the invention.

The invention claimed is:

1. A radar comprising:
    a scanning unit which transmits and receives a detection signal and which varies a beam azimuth of a detection radio wave over a predetermined scanning angular range;
    a signal-strength profile determining unit which determines a signal-strength profile from changes in strength in the azimuthal direction of a received signal from a target at a position that is spaced from the scanning unit as a function of the beam azimuth; and
    an estimating unit which estimates the target azimuth causing the signal-strength profile from the signal-strength profile, which is a portion of a convex located adjacent to the outermost angle in the scanning angular range.

2. The radar according to claim 1, wherein the estimating unit estimates the target azimuth from the ratio between the received signal strengths at at least two beam azimuths.

3. The radar according to claim 2, further comprising a reflectivity determining unit which determines a reflectivity of the target on the basis of the difference between the received signal strengths of the two beam azimuths and the directional characteristic of an antenna that forms the above-described beam.

4. The radar according to claim 1, wherein the estimating unit estimates the target azimuth from the number of beams having received signal strengths exceeding a threshold level and from the received signal strength of at least one of the beams in an azimuth range of half of a beam width, from the outermost angle, having antenna gains exceeding a predetermined threshold level.

5. The radar according to claim 1, wherein the scanning unit includes a primary radiator and a motor for translating the primary radiator in a plane parallel to a focal plane of a dielectric lens.

6. A method of estimating a target azimuth of a target that is outside of and adjacent to a scanning angular range of a radar, the method comprising the steps of:
    transmitting and receiving a detection signal and varying a beam azimuth of a detection radio wave over a scanning angular range using a scanning unit;

determining a signal-strength profile from changes in strength in the azimuthal direction of a received signal from a target at a position that is spaced from the scanning device as a function of the beam azimuth; and estimating the target azimuth causing the signal-strength profile from the signal-strength profile, which is a portion of a convex located adjacent to the outermost angle in the scanning angular range.

7. The radar according to claim 6, wherein the step of estimating includes the step of estimating the target azimuth from the ratio between the received signal strengths at at least two beam azimuths.

8. The radar according to claim 7, further comprising the step of determining a reflectivity of the target on the basis of the difference between the received signal strengths of the two beam azimuths and the directional characteristic of an antenna that forms the beam.

9. The radar according to claim 6, wherein the step of estimating includes the step of estimating the target azimuth from the number of beams having received signal strengths exceeding a threshold level and from the received signal strength of at least one of the beams in an azimuth range of half of a beam width, from the outermost angle, having antenna gains exceeding a predetermined threshold level.

* * * * *